(12) United States Patent
Sato et al.

(10) Patent No.: US 10,520,185 B2
(45) Date of Patent: Dec. 31, 2019

(54) HEATER DEVICE FOR HEATING LIQUEFIED GAS

(71) Applicant: Nippon Thermostat Co., Ltd., Tokyo (JP)

(72) Inventors: Yoji Sato, Tokyo (JP); Kazuhito Shimomura, Tokyo (JP)

(73) Assignee: NIPPON THERMOSTAT CO., LTD., Tokyo (JP)

( * ) Notice: Subject to any disclaimer, the term of this patent is extended or adjusted under 35 U.S.C. 154(b) by 889 days.

(21) Appl. No.: 14/914,128

(22) PCT Filed: Jun. 18, 2014

(86) PCT No.: PCT/JP2014/066133
§ 371 (c)(1),
(2) Date: Feb. 24, 2016

(87) PCT Pub. No.: WO2015/033644
PCT Pub. Date: Mar. 12, 2015

(65) Prior Publication Data
US 2016/0201901 A1    Jul. 14, 2016

(30) Foreign Application Priority Data

Sep. 4, 2013 (JP) .................................. 2013-183256

(51) Int. Cl.
*F23D 11/44* (2006.01)
*F23C 9/00* (2006.01)
(Continued)

(52) U.S. Cl.
CPC ............ *F23D 11/44* (2013.01); *F02M 21/06* (2013.01); *F23C 9/00* (2013.01); *F24H 1/102* (2013.01);
(Continued)

(58) Field of Classification Search
None
See application file for complete search history.

(56) References Cited

U.S. PATENT DOCUMENTS 2,576,228 A * 11/1951 Kinnaird ................... C01B 3/36
422/224
4,423,716 A * 1/1984 Glass ..................... F02M 31/18
123/527
(Continued)

FOREIGN PATENT DOCUMENTS

JP    H06-188103    7/1994
JP    2004-332592 A    11/2004
(Continued)

OTHER PUBLICATIONS

International Search Report for Application No. PCT/JP2014/066133 dated Sep. 9, 2014.

*Primary Examiner* — Avinash A Savani
*Assistant Examiner* — Martha M Becton
(74) *Attorney, Agent, or Firm* — Isshiki international Law Office; Joseph P. Farrar, Esq.

(57) ABSTRACT

A device housing having a hollow portion including a gas intake pipe projectingly provided to an outer periphery of an instrument body, having a heater built therein and attached to the instrument body. In the hollow portion, a heating wall formed by a bulge extending from the outer end side to the inner end side in the axial direction of the intake pipe and the heater for heating are internally provided. Between the heating wall and a gas intake pipe, and between the heating wall and an inner wall of the housing, inner and outer gas flow paths are formed a liquefied gas introduction side opening is provided at an outer end side of the outer gas flow path, and the outer end side of the inner gas flow path is communicated with a gas intake opening of the tip of the gas intake pipe.

15 Claims, 6 Drawing Sheets

(51) Int. Cl.
  *F02M 21/06* (2006.01)
  *F24H 1/10* (2006.01)
  *H05B 3/06* (2006.01)
  *F24H 9/00* (2006.01)
  *H05B 3/44* (2006.01)

(52) U.S. Cl.
  CPC .............. *F24H 9/0021* (2013.01); *H05B 3/06* (2013.01); *H05B 3/44* (2013.01)

(56) References Cited

U.S. PATENT DOCUMENTS

| | | | | |
|---|---|---|---|---|
| 5,855,772 A | * | 1/1999 | Miller | B01D 29/15 210/86 |
| 6,221,522 B1 | * | 4/2001 | Zafred | H01M 8/0252 429/434 |
| 6,505,611 B1 | * | 1/2003 | Oxley | F02M 21/06 123/527 |
| 9,476,393 B2 | * | 10/2016 | Kabasin | F02M 53/06 |
| 2004/0144370 A1 | * | 7/2004 | Mey | F02M 21/06 123/527 |
| 2004/0250798 A1 | * | 12/2004 | Di Gennaro | F02M 21/06 123/527 |
| 2008/0274021 A1 | * | 11/2008 | Neels | B01F 5/0268 422/198 |
| 2011/0272614 A1 | * | 11/2011 | Yamamoto | F02M 21/0236 251/321 |
| 2012/0168680 A1 | * | 7/2012 | Neels | C01B 3/36 252/373 |
| 2012/0175545 A1 | * | 7/2012 | Yamamoto | F02M 21/06 251/366 |
| 2012/0178038 A1 | * | 7/2012 | Hatakeyanna | F02M 21/06 432/219 |
| 2012/0183282 A1 | * | 7/2012 | Hatakeyanna | F02M 21/06 392/480 |
| 2015/0252948 A1 | * | 9/2015 | Schmidt-Lussmann | F02M 21/06 122/32 |

FOREIGN PATENT DOCUMENTS

| | | |
|---|---|---|
| JP | 2005-325686 A | 11/2005 |
| WO | 2011040208 A1 | 4/2011 |

* cited by examiner

US 10,520,185 B2

HEATER DEVICE FOR HEATING LIQUEFIED GAS

CROSS-REFERENCE TO RELATED APPLICATION

This application is a national phase entry under 35 U.S.C. § 371 of International Application No. PCT/JP2014/066133, filed on Jun. 18, 2014, which claims priority to Japanese Patent Application No. 2013-183256, filed on Sep. 4, 2013, the disclosures of which are incorporated herein by reference.

TECHNICAL FIELD

The present invention relates to a heater device for heating liquefied gas in liquefied gas-utilization equipment, which promotes atomization of liquefied gas at low temperatures by heating liquefied gas flowing through a gas flow path.

BACKGROUND ART

For example, in liquefied gas-utilization equipment such as a generator and the like using cassette gas, a heater device to heat and atomize the liquefied gas is provided. In particular, in this type of utilization equipment, even when the use environment of the equipment is at low temperatures, it is necessary to efficiently heat the liquefied gas and atomize it.

FIG. 7 is a system circuit diagram of liquefied gas utilization equipment and reference number 1 of the same figure is a cylinder of liquefied gas. The liquefied gas is taken in into a regulator 4 via a heater device 3 through a piping pipe 2, introduced into a mixer 6 via a piping pipe 5 and is combusted in an engine 7. Then, exhaust gas is evacuated via an exhaust tube 8 and an exhaust manifold 8a.
[Correction 25.09.2014 Under Rule 91]
In addition, in order to atomize the liquefied gas that is sent out form the cylinder 1 through the piping pipe 2 when taken in by the regulator 4, a heat exchanger 9, which is called a vaporizer, is configured by winding the piping pipe 2 around to an exhaust pipe 8 and is configured to function as a heater for pre-heating by utilizing exhaust heat energy of the exhaust pipe 8.

Here, as the heater device 3, the structures described below are known.
[Correction Under Rule 91 25.09.2014]
For example, Patent Document 1 discloses a structure to efficiently heat a fluid to be heated, when passing through the fluid to be heated which is taken in a housing, passing through a through path of a PTC heat generating element after passing through an introduction path formed between an outer peripheral surface of the PTC heat generating element and an inner wall surface of the housing.

Further, Patent Document 2 discloses a heater structure to heat cleaning liquid from one surface of a liquid supply path by housing a heat transmission body formed by superposing members provided with grooves that are meandering liquid supply paths, a flat plate heater and a spring electrode terminal pressing against one surface side inside a heat resistant insulation case.

PRIOR ART DOCUMENTS

Patent Documents

Patent Document 1: JP-H06-188103-A
Patent Document 2: Japanese Utility Model Publication No. 61-122150

SUMMARY OF THE INVENTION

Technical Problem

However, according to the configurations as described above, in the liquefied gas utilization equipment system which heats by using the exhaust heat of the exhaust pipe, due to the heat shortage and the necessity of a long period of heating time, it could not atomize liquefied butane especially at low temperatures.

Moreover, in cold regions and at low temperatures such as in winter, in a short flow path, since the transit time and the heating time is short, heating must be carried out at high temperatures and thus higher power was necessary.

Further, conventionally, since the heater device 3 was provided between the piping pipe 2, which connects the cylinder 1 and the regulator 4, a piping pipe was needed between the heater device 3 and the regulator 4 and also since the heated fluid was cooled while flowing in the pipe 2, another heater 6a was needed and thus the number of components increased. Further, the number of components increased and the device was not easy to assemble. When the fluid was liquid or half solid there was less possibility of ignition but when the liquefied gas was a volatile gas, installation of the heater device 3 between the pipes 2 as conventionally, there were problems in smooth operation, durability and safety.
[Correction Under Rule 91 25.09.2014]
Moreover, in the conventional heater structure as described above, both were small sized and were inferior in terms of performing efficient heating.

The present invention has been conceived in view of such circumstances, and an object of the present invention is to obtain a heater device for heating liquefied gas which can heat and atomize the gas efficiently even at low temperatures by increasing the flow path length and the transit time to be heated by the heater, and by spending time to heat the liquefied gas.

Solving the Technical Problem

In order to attain such objects, the heater device for heating liquefied gas pertaining to the present invention (the invention recited in claim 1) is, in liquefied gas-utilization equipment which promotes atomization of liquefied gas at low temperatures by heating liquefied gas flowing through a gas flow path, the heater includes a device housing having a hollow portion including a gas intake pipe projectingly provided to an outer of an instrument body such that liquefied gas is taken in from an outer end, the device housing is attached to an instrument body in a state in which a liquefied gas flow path is formed within the hollow portion and a heater that heats the inside of the hollow portion is built therein, wherein the liquefied gas flow path includes a return flow path formed by folding at least one of an end portion of the flow path inside the hollow portion of the device housing.

The heater device for heating liquefied gas pertaining to the present invention (the invention recited in claim 2), in the heater device for heating liquefied gas recited in claim 1, the heater is provided at a portion where all or one portion of the gas flow path formed within the hollow portion can be heated.

The heater device for heating liquefied gas pertaining to the present invention (the invention recited in claim 3), in the heater device for heating liquefied gas recited in claim 1 or 2, the hollow portion is formed in a cylindrical shape so as to surround the gas intake pipe across a predetermined interval.

The heater device for heating liquefied gas pertaining to the present invention (the invention recited in claim 4), in the heater device for heating liquefied gas recited in any one of claims 1 through 3, the hollow portion of the device housing, a partition wall is provided which partitions the inside of the hollow portion such that a plurality of flow paths communicate with each other.

The heater device for heating liquefied gas pertaining to the present invention (the invention recited in claim 5), in the heater device for heating liquefied gas recited in claim 4, the partition wall is formed in a shape so as to surround a periphery of the gas intake pipe across a predetermined interval.

The heater device for heating liquefied gas pertaining to the present invention (the invention recited in claim 6), in the heater device for heating liquefied gas recited in claim 5, the partition wall is formed in a cylindrical shape forming the gas flow paths with inner walls therebetween of the hollow portion and with the gas intake pipe therebetween by protruding towards an axial direction of the gas intake pipe inside the hollow portion of the device housing.

The heater device for heating liquefied gas pertaining to the present invention (the invention recited in claim 7), in the heater device for heating liquefied gas recited in any one of claims 4 through 6, the heater is assembled within the partition wall and is configured to heat liquefied gas which flows through the gas flow paths formed on both sides of the partition wall.

The heater device for heating liquefied gas pertaining to the present invention (the invention recited in claim 8), in the heater device for heating liquefied gas recited in any one of claims 4 through 7, the partition wall is formed in a cylindrical shape so as to surround the intake pipe across a predetermined interval in the hollow portion of the device housing and a tubular passages formed at inner and outer peripheries of the partition wall are formed as return flow paths by communicating with each other at the inner end of the partition wall.

The heater device for heating liquefied gas pertaining to the present invention (the invention recited in claim 9), in the heater device for heating liquefied gas recited in claim 7 or 8, in the partition wall, either of a planar or a cylindrical heater that conforms to the shape of the partition wall or, a plurality of rod-shaped, planar or column-shaped heaters which substantially uniformly heat the heater wall.

The heater device for heating liquefied gas pertaining to the present invention (the invention recited in claim 10), in liquefied gas-utilization equipment which promotes atomization of liquefied gas at low temperatures by heating liquefied gas flowing through a gas flow path, the heater includes a device housing having a hollow portion including a gas intake pipe projectingly provided to an outer of an instrument body such that liquefied gas is taken in from an outer end, the device housing is attached to an instrument body in a state in which a liquefied gas flow path is formed within the hollow portion and a heater that heats the inside of the hollow portion is built therein, wherein the liquefied gas flow path includes a return flow path formed by folding at least one of an end portion of the flow path inside the hollow portion of the device housing, a cylindrical metal case with the heater built therein and having a tip end thereof closed, wherein metal case is provided to the device housing so as to extend along an axial direction by inserting into the inner side from an outer end of the intake pipe, wherein a flow path for heating liquefied gas is formed between the cylindrical metal case and an inner wall of the gas intake pipe.

The heater device for heating liquefied gas pertaining to the present invention (the invention recited in claim 11), in the heater device for heating liquefied gas recited in claim 10, the hollow portion is formed in a cylindrical shape so as to surround the gas intake pipe across a predetermined interval.

The heater device for heating liquefied gas pertaining to the present invention (the invention recited in claim 12), in the heater device for heating liquefied gas recited in claim 10 or 11, in the hollow portion of the device housing, a partition wall is provided which partitions the inside of the hollow portion such that a plurality of flow paths communicate with each other.

The heater device for heating liquefied gas pertaining to the present invention (the invention recited in claim 13), in the heater device for heating liquefied gas recited in any one of the claims 10 through 12, the partition wall is formed in a shape so as to surround a periphery of the gas intake pipe across a predetermined interval.

The heater device for heating liquefied gas pertaining to the present invention (the invention recited in claim 14), in the heater device for heating liquefied gas recited in claim 13, the partition wall is formed in a cylindrical shape forming the gas flow paths with inner walls therebetween of the hollow portion and with the gas intake pipe therebetween by protruding towards an axial direction of the gas intake pipe inside the hollow portion of the device housing.

The heater device for heating liquefied gas pertaining to the present invention (the invention recited in claim 15), in the heater device for heating liquefied gas recited in any one of claims 12 through 14, the partition wall is formed in a cylindrical shape so as to surround the intake pipe across a predetermined interval in the hollow portion of the device housing and a tubular passages formed at inner and outer peripheries of the partition wall are formed as return flow paths by communicating with each other at the inner end of the partition wall.

The heater device for heating liquefied gas pertaining to the present invention (the invention recited in claim 16), in the heater device for heating liquefied gas recited in any one of claims 10 through 15, a plurality of fins are provided along an outer wall of the cylindrical metal case.

The heater device for heating liquefied gas pertaining to the present invention (the invention recited in claim 17), in the heater device for heating liquefied gas recited in any one of claims 1 through 16, the gas intake pipe is made from metal material.

Effect of the Invention

As described above, according to the heater device for heating liquefied gas pertaining to the present invention, it is configured such that a device housing having a hollow portion including a gas intake pipe projectingly provided to an outer of an instrument body such that liquefied gas is taken in from an outer end, the device housing is attached to an instrument body in a state in which a liquefied gas flow path is formed within the hollow portion and a heater that heats the inside of the hollow portion is built therein, wherein the liquefied gas flow path includes a return flow path formed by folding at least one of an end portion of the flow path inside the hollow portion of the device housing, and thus various superior effects listed below are exhibited.

1. The vaporizer (liquefied gas evaporator), the piping pipes and the heater device which is provided separately become unnecessary and thus the number of components decreases, the number of assembling steps and costs can be reduced and the entire device can be downsized.
2. Although the flow path structure is complicated, since the intake pipe having the gas intake opening is assembled with the device housing and configured to serve as a part of the gas flow path, the number of components and the number of assembling steps can be reduced.
[Rule 91 Correction 25.09.2014]
3. Further, even when the fluid is a volatile liquefied gas, the airtightness and the safety are improved.
4. The flow path distance can be increased while suppressing the overall height of the heater device, the product itself can be downsized and thus it becomes possible to improve layout flexibility.
5. The assembly is assembled by assembling the device housing with a built-in heater to the liquefied gas utilization equipment (regulator) and is fixed in place only by bolts, and thus assembly of the complicated flow path structure is easy.

Further, according to the present invention, in the hollow portion of the device housing, since the partition walls for partitioning the inner side of the hollow portion to be a plurality of flow paths communicating with each other are provided, the following superior effects are exhibited:
1, After ensuring the overall size reduction, it is possible to form a return flow path in the hollow portion of the device housing and thus it is possible to efficiently heat the gas fluid using the heater which is built in the housing.

Further, according to the present invention, the partition walls are, in the hollow portion of the device housing, for example, formed in a cylindrical shape so as to surround the intake pipe at a predetermined interval and the tubular passage, formed on the inner and outer peripheries of the intake pipe, is formed as a return flow path by communicating with the inner end of the heating wall and, further to the partition wall which is cylindrical or the like, by providing either of a planar or cylindrical heater shaped to match the shape of the partition wall, or a plurality of bar-like shaped, a planar or a column-shaped heater that heats the heating wall substantially uniformly, to function as a heating wall, the following superior effects are exhibited.
1 Since the overall height of the heater device is reduced, the flow path length is lengthened and the contact surface area with the heater is widened, it is possible to efficiently heat the gas with a small electric power consumption.
2 It is possible to securely atomize in a short period of time even at low temperatures.

Further, according to the heater device for heating liquefied gas pertaining to the present invention includes a cylindrical metal case with the heater built therein and having a tip end thereof closed, wherein the metal case is provided to the device housing so as to extend along an axial direction by inserting into the inner side from an outer end of the intake pipe, wherein a flow path for heating liquefied gas is formed between the cylindrical metal case and an inner wall of the gas intake pipe, and thus the following superior effects are exhibited in addition to the various effects described above.
1 Since the heater is placed in the metal case and is extended into the gas intake pipe and the flow path for heating the liquefied gas is formed along thereof, it is possible to more efficiently heat the liquefied gas.
2 In particular, since fins are provided along the outer wall of the metal case, heating the liquefied gas passing through the flow path can be carried out more efficiently.

DETAILED DESCRIPTION OF EMBODIMENTS OF THE INVENTION

Figure 1:
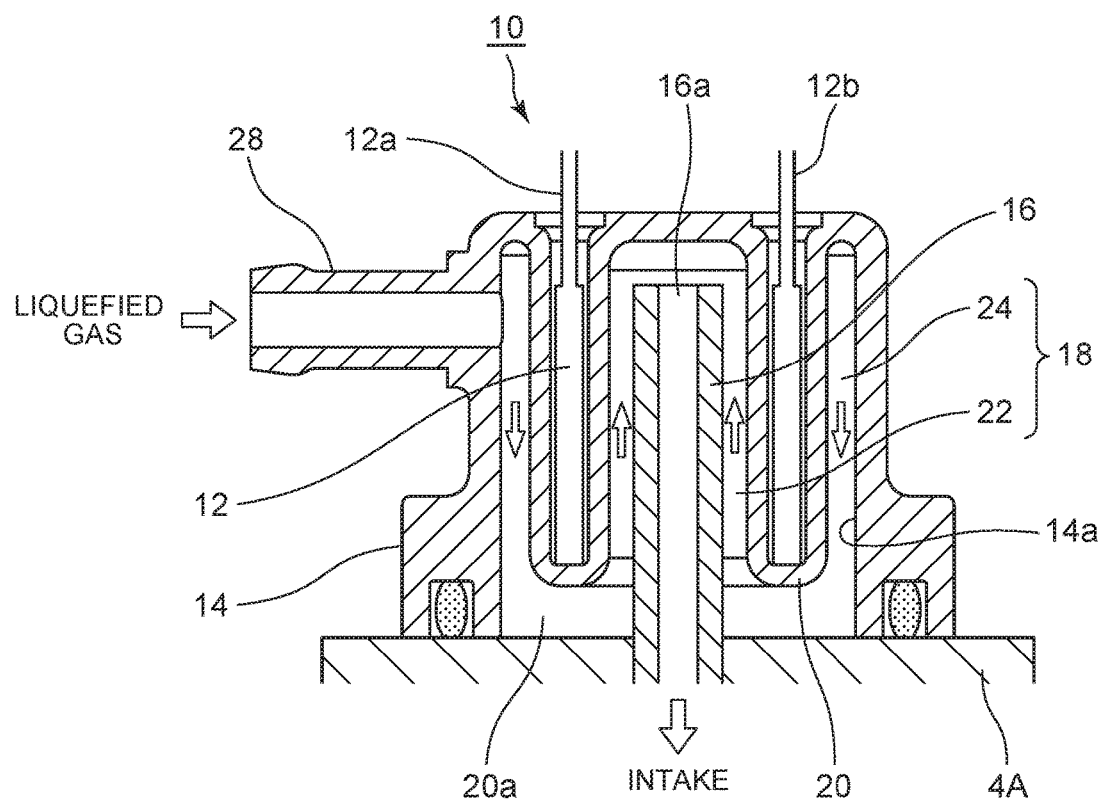
FIG. 1 is a cross-sectional view of a main portion showing an embodiment of a heater device for heating liquefied gas according to the present invention.

FIGS. 1 to 4 show an embodiment of a heater device for heating liquefied gas according to the present invention. In the figures, portions that are the same as or corresponding to portions shown in FIG. 7 described above are denoted by the same reference numbers and explanations thereof will be omitted.

Now, according to the present invention, in a vaporizer serving as liquefied gas-utilization equipment, a heater device 10 for heating liquefied gas that promotes atomization of liquefied gas at low temperatures by heating liquefied gas flowing through a gas flow path is provided. The heater device 10 is, in the system shown in FIG. 4, equipped with a device housing 14 having substantially a cup shape with a built-in heater 12 having a cylindrical shape or the like for heating liquefied gas, and when it is assembled to a regulator 4, when having a gas intake opening 16a protruding from the regulator 4 a hollow portion 18 is provided between the device housing 14. The hollow portion 18 becomes a part of a gas flow path that makes the gas pass through meanderingly. When the gas passes through the flow path the gas flows along two surfaces, which are an outer peripheral surface and an inner peripheral surface of the cylindrical heater 12, and has a heater structure that is configured to heat efficiently.

Figure 2:
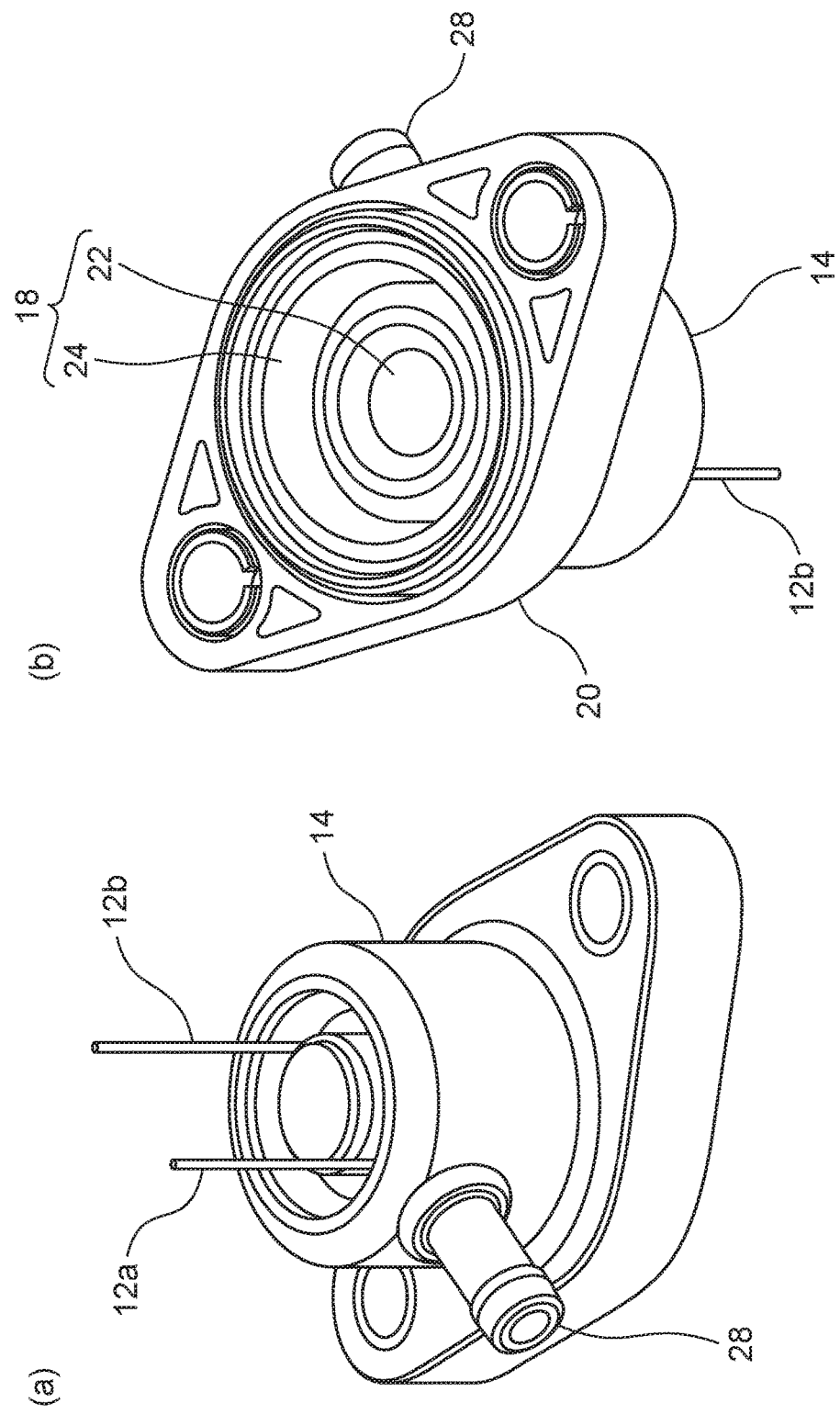
FIG. 2 is a schematic perspective view from outer end side (a) and inner end side (b) showing schematic structures of a heater device for heating liquefied gas according to the present invention.
Figure 3:
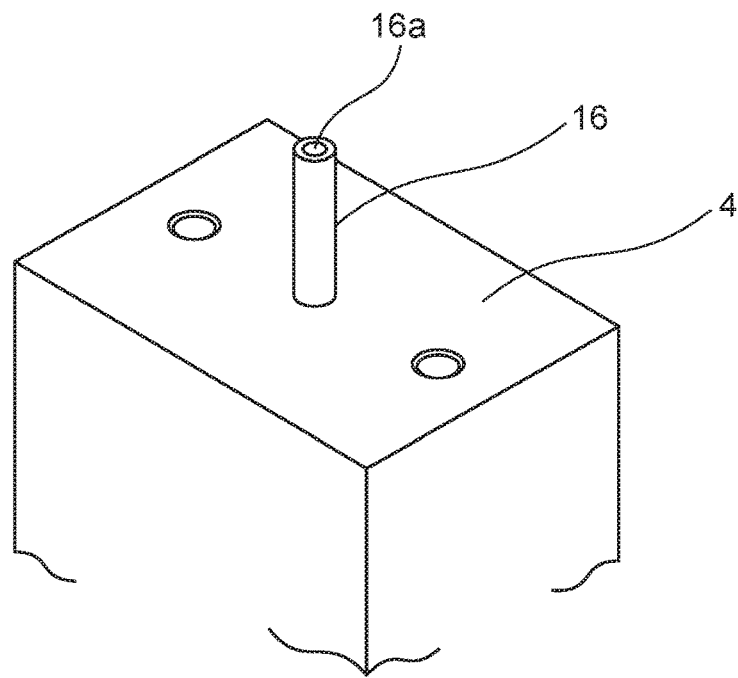
FIG. 3 is a schematic perspective view of an instrument body of the liquefied gas utilization equipment for attaching the heater device for heating liquefied gas according to the present invention.
Figure 4:
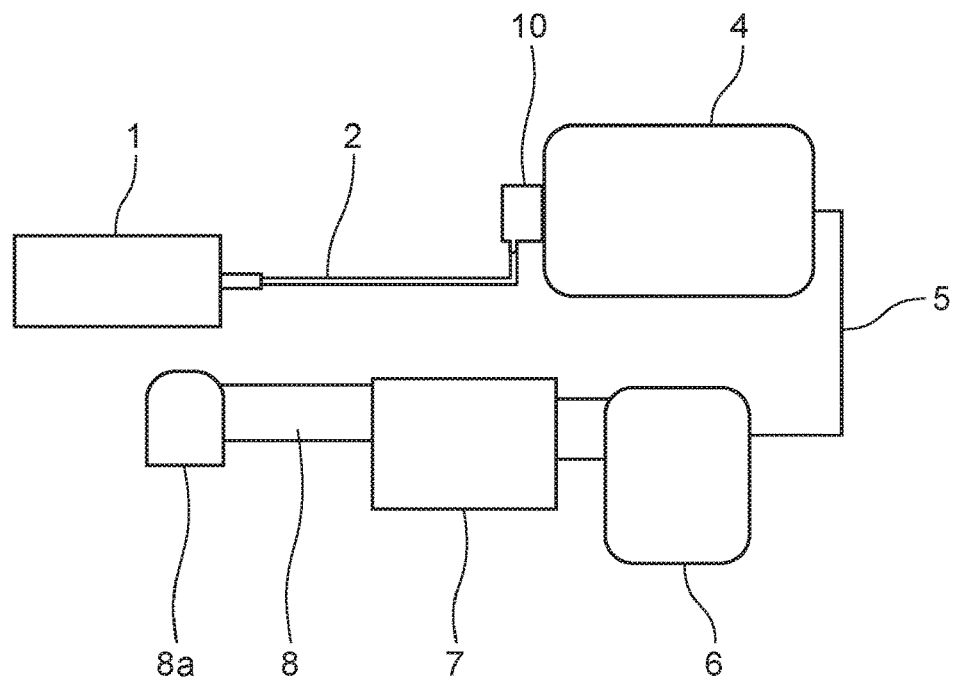
FIG. 4 is a system circuit diagram of liquefied gas-utilization equipment applying the heater device for heating liquefied gas according to the present invention.

Describing this in detail, in FIGS. 1 to 3, there is provided a device housing 14 which is projectingly provided to the outer of an instrument body 4A configuring the regulator 4 and which includes a gas intake pipe 16 which takes in liquefied gas from an outer end, the device housing 14 includes a hollow portion 18 which forms a liquefied gas flow path and includes therein a heater 12 for heating liquefied gas, the device housing 14 is attached to an instrument body 4A.

In the hollow portion 18 of the device housing 14, a partition wall 20 which becomes a heating wall is formed by a bulge extending from the outer end side to the inner end side in the axial direction of the intake pipe 16 and internally providing a heater 12 for heating, gas flow paths 22, 24 are formed between the partition wall 20 and the gas intake pipe 16 and, the partition wall 20 and an inner wall 14a of the housing 14. These inner, outer gas paths 22, 24 are communicated with the inner end side of the device housing 14. An introduction pipe 28, which is a liquefied gas introduction side opening, is formed at an outer end side of the outer gas flow path 24 and the outer end side of the inner gas flow path 22 is communicated with a gas intake opening 16a of the tip of the gas intake pipe 16.

Here, the partition wall 20 is formed in a cylindrical shape so as to surround the intake pipe 16 across a predetermined interval in the hollow portion 18 of the device housing 14. The inner, outer gas flow paths 22, 24 as tubular passage formed at the inner and the outer peripheries of the partition wall 20 are formed as return flow paths by communicating with each other in the inner end (in the figure, the part of 20a) of the partition wall 20.

In the drawings, 12a, 12b are lead wires connected to the heater 12.

Further, as the heater 12 for heating the liquefied gas, which is an object to be heated fluid, for example, ceramic heaters, PTC heating elements or the like, which can efficiently heat liquefied gas, are preferable.

In the above-described configuration, the heater 12 generates heat when energized. When the liquefied gas passes through the inner and outer gas flow paths, which are meanderingly formed on both side surfaces of the partition wall 20, with the heater 12 built-in as return flow paths, the liquefied gas is heated by heat conduction. That is, within the hollow portion 18 of the device housing 14, from the liquefied gas introduction opening 28 provided to the inner wall thereof, the liquefied gas, which flows the liquefied gas flow path, that is, from the return flow path through the liquefied gas intake opening 16a of the tip of the gas intake pipe 16, can be efficiently heated.

According to this configuration, since the flow path length and the transit time for heating by the heaters 12 formed at two surfaces on both sides along the partition wall 20 are lengthened, the time to heat the gas lengthens and the gas can be heated efficiently and be atomized even at low temperatures.

Figure 7:
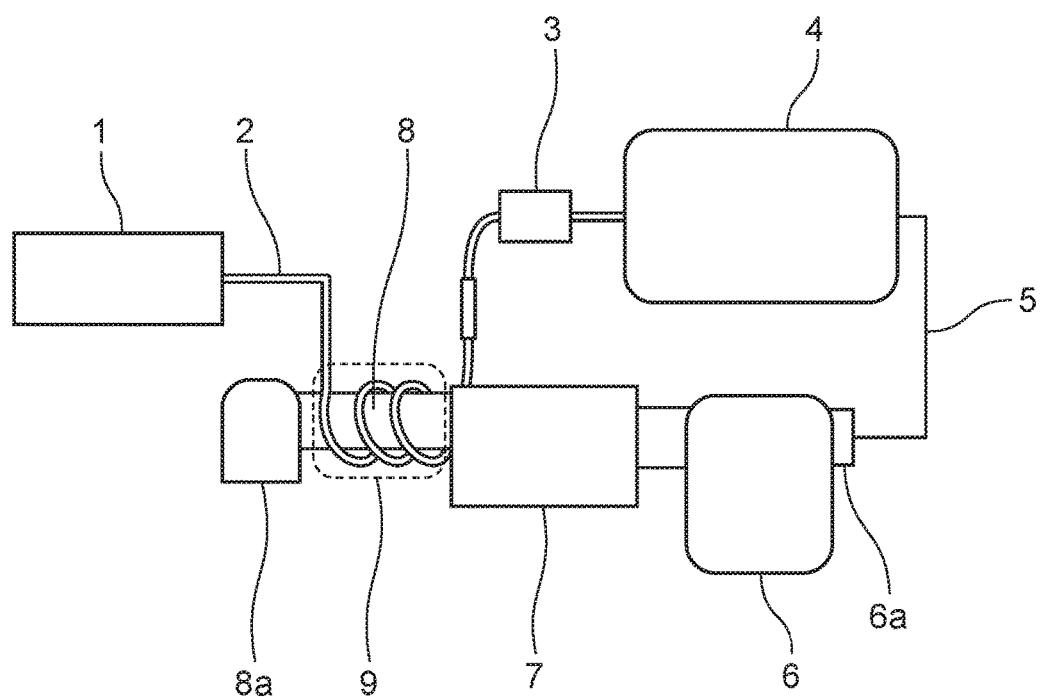
FIG. 7 is a system circuit diagram of a conventional liquefied gas utilization equipment.

In particular, in the conventional device, as shown in FIG. 7, the exhaust pipe 8 configures a heat exchange portion 9 by winding the piping pipe 2 for the gas flow and is used in conjunction with the heat of the exhaust heat at the exhaust pipe 8. However, according to the configuration described above, such heat exchange portion 9 becomes unnecessary and the number of components are reduced, the number of assembly steps and cost can be reduced, thereby enabling the entire device to be downsized.

Further, in the configuration described above, although the return flow path is formed by using two surfaces at both sides of the partition walls formed within the device housing 14 and is a complicated flow path, the intake pipe 16, which has the gas intake opening 16a, is assembled with the device housing 14 and also serves as a part of the gas flow path, the number of components and assembly steps can be reduced.

Furthermore, even when the used fluid is a volatile liquefied gas, the airtightness and the safety are improved. Further, the flow path distance can be increased while suppressing the size of the heater device 12, the product itself can be downsized and thus it becomes possible to improve layout flexibility. Moreover, the assembly is assembled by assembling device housing 14 provided with the partition wall 20 having the built-in heater to the liquefied gas utilization equipment and is fixed in place only by bolts and thus assembly of the complicated flow path structure is easy.

Further, by providing a cylindrical partition wall 20 and using two surfaces on both sides thereof, the size of the heater 12 is reduced, the flow path length is lengthened and the contact surface area with the heater 12 is widened, thus it is possible to efficiently heat the gas with a small electric power consumption. Furthermore, it is possible to securely atomize in a short period of time even at low temperatures.

The present invention is not limited to the structures described in the above embodiment, and it is apparent that the shape, structure and the like of each part of the device 10 can be appropriately deformed or modified.

For example, although in the embodiment described above, a heater 12 having a cylindrical shape is provided at the cylindrical partition wall 20, it is not limited to this and a plurality of heaters that heat the partition wall 20 substantially uniformly can be provided in an appropriate arrangement state. The heaters may have a rod-like shape, planar shape, band planar shape or the like, or may have an appropriate shape or structure matching the places of the partition wall 20 or the like where the heaters are built in. In short, it is sufficient if a heating flow path is formed along one surface or both surfaces of the partition wall 20.

Further, the invention is not limited to the structure where the heating wall is configured by building in the heater 12 to such partition wall 20 and it is apparent that a heater 12 that has an appropriate shape and structure can be provided to an appropriate place of the device housing 14. In short, as long as the portion is a portion where the liquefied gas flowing through the gas flow paths 22 and 24 or the like formed inside the device housing 14 can be heated, it can be provided anywhere.

Figure 5:
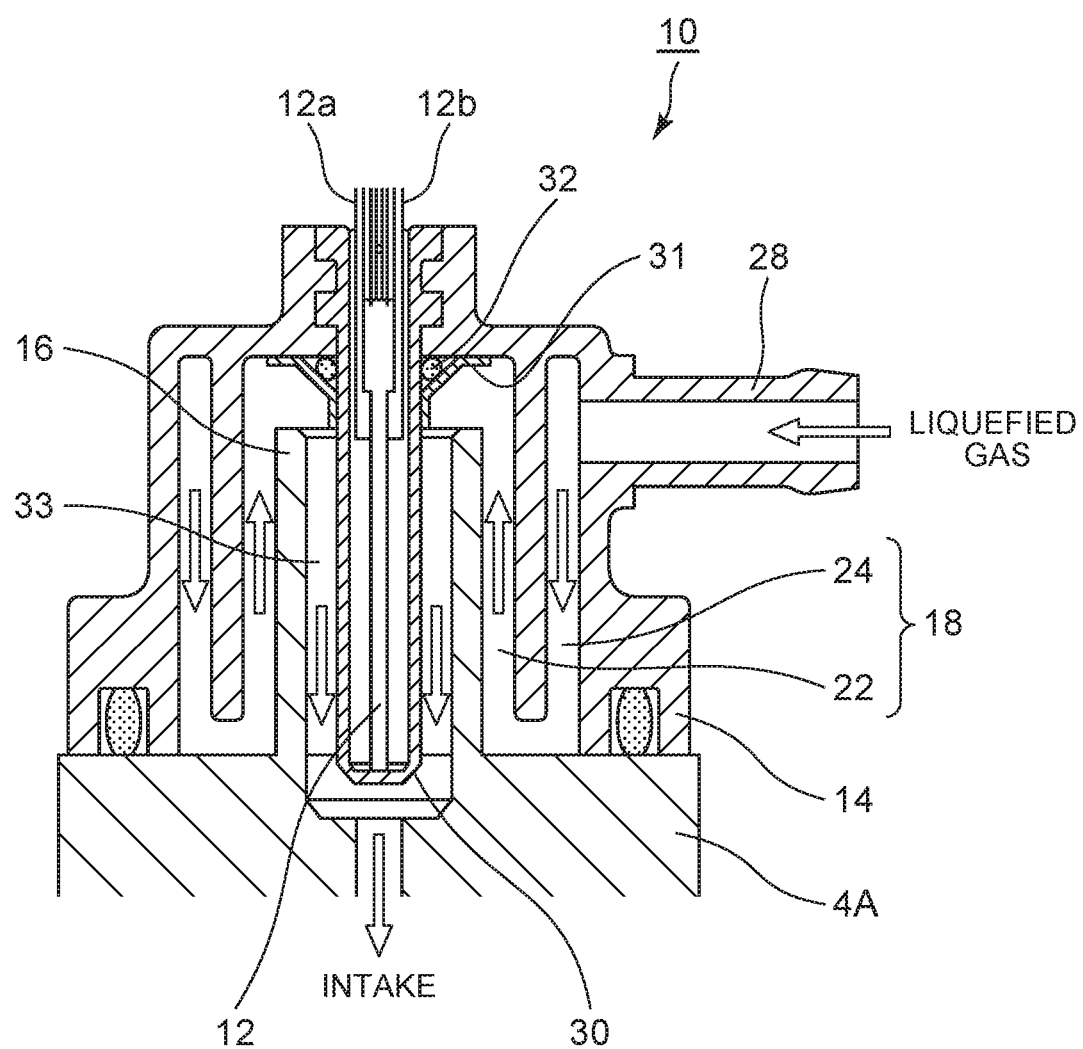
FIG. 5 is a cross-sectional view of a main portion showing another embodiment of a heater device for heating liquefied gas according to the present invention.
Figure 6:
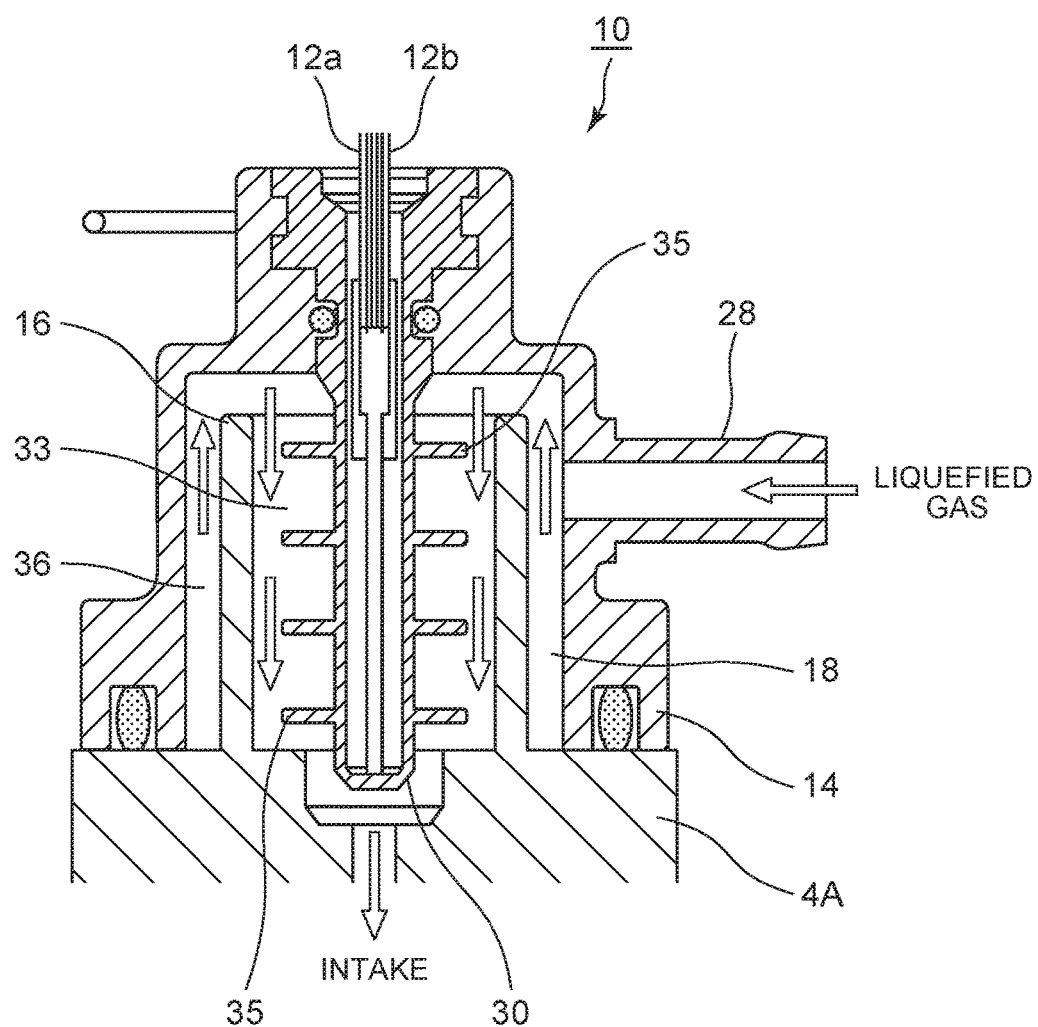
FIG. 6 is a cross-sectional view of a main portion showing still another embodiment of a heater device for heating liquefied gas according to the present invention.

Furthermore, the heater device for heating liquefied gas pertaining to the present invention is not limited to the structure or the like as described in the above embodiment and, for example, the shapes and structures as shown in FIGS. 5 and 6 may be adopted.

That is, FIG. 5 shows another embodiment of a heating device for heating liquefied gas pertaining to the present invention and in this embodiment, in which a metal case 30 with a heater 12 built therein is used and is provided in a state in which the distal end side of the heater is facing the inner side of the device housing 14.

The heater device is formed such that it includes the cylindrical metal case 30 with the heater 12 built therein and with the tip end thereof closed, providing the metal case 30 to the device housing 14 so as to extend along the axial direction by inserting into the inner side from the outer end of the intake pipe 16 and forming the flow path 33 for heating liquefied gas between the cylindrical metal case 30 and the inner wall of the gas intake pipe 16.

In this embodiment, the protruding portion of the intake pipe 16 is formed in a large diameter tubular body shape and a metal case 30 having a heater 12 built therein is interpolated, and by forming a gas flow path 33 for heating gas between the intake pipe 16 and the metal case 30, an efficient heating effect can be obtained. Here, the device may be configured to heat at the flow path 22 between the outer side of the intake pipe 16 and the hollow portion inside the housing 14 by forming the intake pipe 16 of metal and transferring heat.

In FIG. 5, reference number 31 is a supporting member which supports the metal case 30 with the heater built therein in a state in which the metal case is vertically installed at the central axis portion inside the hollow portion of the housing 14 and, 32 is an O-ring for sealing.

Even with such an embodiment structure, similar to the embodiment described above, the liquefied gas can be efficiently and appropriately heated and atomized.

FIG. 6 shows still another embodiment of a heater device of heating liquefied gas pertaining to the present invention, and in this embodiment, as compared with the embodiment of FIG. 5 described above, the intake pipe 16 is formed with a much larger diameter, and at the outer periphery of the metal case 30 with a heater 12 built therein, a plurality of fins 35 are arranged in parallel, such that the device may be configured so as to further improve the heat exchange efficiency within the gas flow path 33.

In this embodiment, unlike the embodiments described above, the partition wall 20 is omitted and the shape of the hollow portion of the housing 14 is simplified. However, the present embodiment is not limited thereto and is apparent that such partition wall can be provided as required. In short, a liquefied gas flow path may be formed in an appropriate folded shape within the hollow portion by folding the liquefied gas channel in an appropriate shape, and by heating with a built-in heater 12, and efficient atomization can be carried out.

LIST OF REFERENCE NUMBERS 1 cylinder
2 piping pipe
4 regulator (liquefied gas utilization equipment)
4A instrument body
5 piping pipe
6 mixer
7 engine
8 exhaust pipe
10 heater device
12 heater
12a, b lead wire
14 device housing
16 gas intake pipe
16a gas intake opening
18 hollow portion
20 partition wall
22 inner gas flow path
24 outer gas flow path
28 introduction pipe which is a liquefied gas introduction side opening
30 cylindrical metal case
33 liquefied gas flow path
35 fin

What is claimed is:

1. A heater device for heating liquefied gas in liquefied gas-utilization equipment that promotes atomization of liquefied gas at low temperatures by heating liquefied gas flowing through a gas flow path, the heater device comprising:
   a liquefied gas introduction pipe (28);
   a gas intake pipe (16) to supply liquefied gas to an instrument body (4A);
   a device housing having a hollow portion (18), an inner end (20a) adjacent the instrument body (4A) and a partition wall (20) extending axially from an outer end of the device housing towards the inner end (20a), the hollow portion having an annular inner hollow portion (22) and an annular outer hollow portion (24) formed concentrically to each other by the partition wall and wherein the inner and outer hollow portions are fluidically connected by a hollow radial annular portion along the inner end (20a); and
   a heater (12) located within the partition wall (20) of the device housing for heating the liquefied gas; wherein the gas intake pipe projects axially from the device housing inner end and protrudes through an outer periphery of the instrument body (4A) such that a gas intake opening (16a) of the gas intake pipe is located within the device housing; and
   wherein the device housing hollow portion forms a serpentine liquefied gas flow path from the gas introduction pipe (28) to the gas intake opening (16a), the gas intake pipe defining a center axis of the heater device with the inner hollow portion arranged concentrically about the gas intake pipe and the outer hollow portion arranged centrically about the inner hollow portion so that the liquefied gas flows axially within the outer hollow portion (24) along the partition wall (20) toward the inner end (20a), radially inward towards the inner hollow portion (22) then axially up along the partition wall within the inner hollow portion where it then enters the gas intake opening to be introduced into the instrument body from the gas intake pipe.

2. The heater device for heating liquefied gas according to claim 1, wherein the heater is provided at a portion where all or one portion of the gas flow path formed within the hollow portion can be heated.

3. The heater device for heating liquefied gas according to claim 1, wherein the hollow portion is formed in a cylindrical shape so as to surround the gas intake pipe across a predetermined interval.

4. The heater device for heating liquefied gas according to claim 1, wherein the partition wall is formed in a shape so as to surround a periphery of the gas intake pipe across a predetermined interval.

5. The heater device for heating liquefied gas according to claim 4, wherein the partition wall is formed in a cylindrical shape forming the gas flow path with inner walls therebetween of the hollow portion and with the gas intake pipe therebetween by protruding towards an axial direction of the gas intake pipe inside the hollow portion of the device housing.

6. The heater device for heating liquefied gas according to claim 1, wherein the partition wall is formed in a cylindrical shape so as to surround the intake pipe across a predetermined interval in the hollow portion of the device housing, and tubular passages formed at inner and outer peripheries of the partition wall are formed as return flow paths by communicating with each other at the inner end of the partition wall.

7. The heater device for heating liquefied gas according to claim 1, wherein either of a planar heater or a cylindrical heater that conforms to the shape of the partition wall, or a plurality of rod-shaped, planar, or column-shaped heaters that substantially uniformly heat the heater wall, are provided to the partition wall.

8. The heater device for heating liquefied gas according to claim 1, wherein the gas intake pipe is made of a metal material.

9. A heater device for heating liquefied gas in liquefied gas-utilization equipment that promotes atomization of liquefied gas at low temperatures by heating liquefied gas flowing through a gas flow path, the heater device comprising:
   a liquefied gas introduction pipe (28);
   a gas intake pipe (16) to supply liquefied gas to an instrument body (4A);
   a device housing having a hollow portion (18), an inner end (20a) adjacent the instrument body (4A) and a partition wall (20) extending axially from an outer end of the device housing towards the inner end (20a), the hollow portion having an annular inner hollow portion (22) and an annular outer hollow portion (24) formed concentrically to each other by the partition wall and wherein the inner and outer hollow portions are fluidically connected by a hollow radial annular portion along the inner end (20a); and a heater (12) located within the gas intake pipe (16) for heating the liquefied gas; wherein the gas intake pipe projects axially from the device housing inner end and protrudes through an outer periphery of the instrument body (4A) such that a gas intake opening (16a) of the gas intake pipe is located within the device housing; and wherein the device housing hollow portion forms a serpentine liquefied gas flow path from the gas introduction pipe (28) to the gas intake opening (16a), the heater defining a center axis of the heater device with the gas intake pipe arranged concentrically about the heater, the inner hollow portion arranged concentrically about the gas intake pipe and the outer hollow portion arranged centrically about the inner hollow portion so that the liquefied gas flows axially within the outer hollow portion (24) along the partition wall (20) toward the inner end (20a), radially inward towards the inner hollow portion (22) then axially up along the partition wall within the inner hollow portion where it then enters the gas intake opening to be introduced into the instrument body from the gas intake pipe.

10. The heater device for heating liquefied gas according to claim 9, wherein the hollow portion is formed in a cylindrical shape so as to surround the gas intake pipe across a predetermined interval.

11. The heater device for heating liquefied gas according to claim 9, wherein the partition wall is formed in a shape so as to surround a periphery of the gas intake pipe across a predetermined interval.

12. The heater device for heating liquefied gas according to claim 9, wherein the partition wall is formed in a cylindrical shape forming the gas flow path with inner walls therebetween of the hollow portion and with the gas intake pipe therebetween by protruding towards an axial direction of the gas intake pipe inside the hollow portion of the device housing.

13. The heater device for heating liquefied gas according to claim 9, wherein the partition wall is formed in a cylindrical shape so as to surround the intake pipe across a predetermined interval in the hollow portion of the device housing, and tubular passages formed at inner and outer peripheries of the partition wall are formed as return flow paths by communicating with each other at the inner end of the partition wall.

14. The heater device for heating liquefied gas according to claim 9, wherein a plurality of fins are provided along an outer wall of the cylindrical metal case.

15. The heater device for heating liquefied gas according to claim 9, wherein the gas intake pipe is made of a metal material.

* * * * *